United States Patent [19]
Hiestand

[11] Patent Number: 5,174,179
[45] Date of Patent: Dec. 29, 1992

[54] HOLDING DEVICE

[75] Inventor: Karl Hiestand, Pfullendorf, Fed. Rep. of Germany

[73] Assignee: SMW Schneider & Weisshaupt GmbH, Meckenbeuren, Fed. Rep. of Germany

[21] Appl. No.: 577,253

[22] Filed: Aug. 31, 1990

[30] Foreign Application Priority Data

Sep. 1, 1989 [DE] Fed. Rep. of Germany ....... 3929010

[51] Int. Cl.⁵ ............................................. B23B 33/00
[52] U.S. Cl. ........................................ 82/165; 82/142; 279/6
[58] Field of Search ................. 279/6, 1 H; 82/165, 82/142; 409/221; 408/13

[56] References Cited

U.S. PATENT DOCUMENTS

| | | | |
|---|---|---|---|
| 3,063,311 | 11/1962 | Beckwith et al. | 408/13 |
| 3,129,950 | 4/1964 | Galler | 279/6 |
| 3,178,192 | 4/1965 | Sampson | 279/6 |
| 3,259,394 | 7/1966 | Buck | 279/6 |
| 3,991,652 | 11/1976 | Fini, Jr. | 408/3 |

FOREIGN PATENT DOCUMENTS 553300  5/1943  United Kingdom ............... 82/165

OTHER PUBLICATIONS

Patent Abstracts of Japan Band 4, No. 6 (M-88), 18 Jan. 1980; & JP-A-54142673 (Hitachi Seisakusho) Jul. 11, 1979.

Patent Abstracts of Japan Band 7, No. 197 (M-239) (1342) 27 Aug. 1983; & JP-A-58094901 (Senjiyou Seiki) Jun. 6, 1983.

Primary Examiner—Larry I. Schwartz
Assistant Examiner—Robert Schultz
Attorney, Agent, or Firm—Robert W. Becker & Associates

[57] ABSTRACT

A holding device on a turning machine for a workpiece, which is held by a chuck serving as a clamping device and being arranged at a receiving disk, is equipped with separate correcting elements disposed at the clamping device. The correcting elements may be controlled individually by electrical, pneumatic or hydraulic means. The correcting elements act on the clamping device in order to adjust the workpiece.

It is thereby possible to adjust the clamping device itself in a defined manner, so that the clamped workpiece may be adjusted easily.

12 Claims, 10 Drawing Sheets

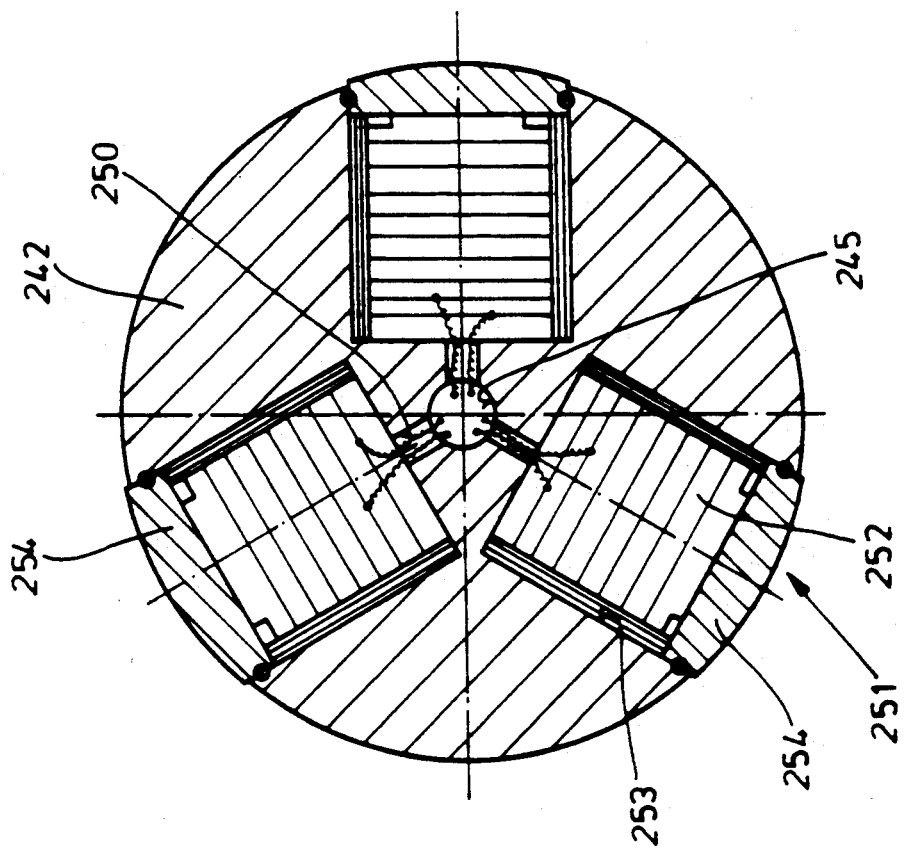
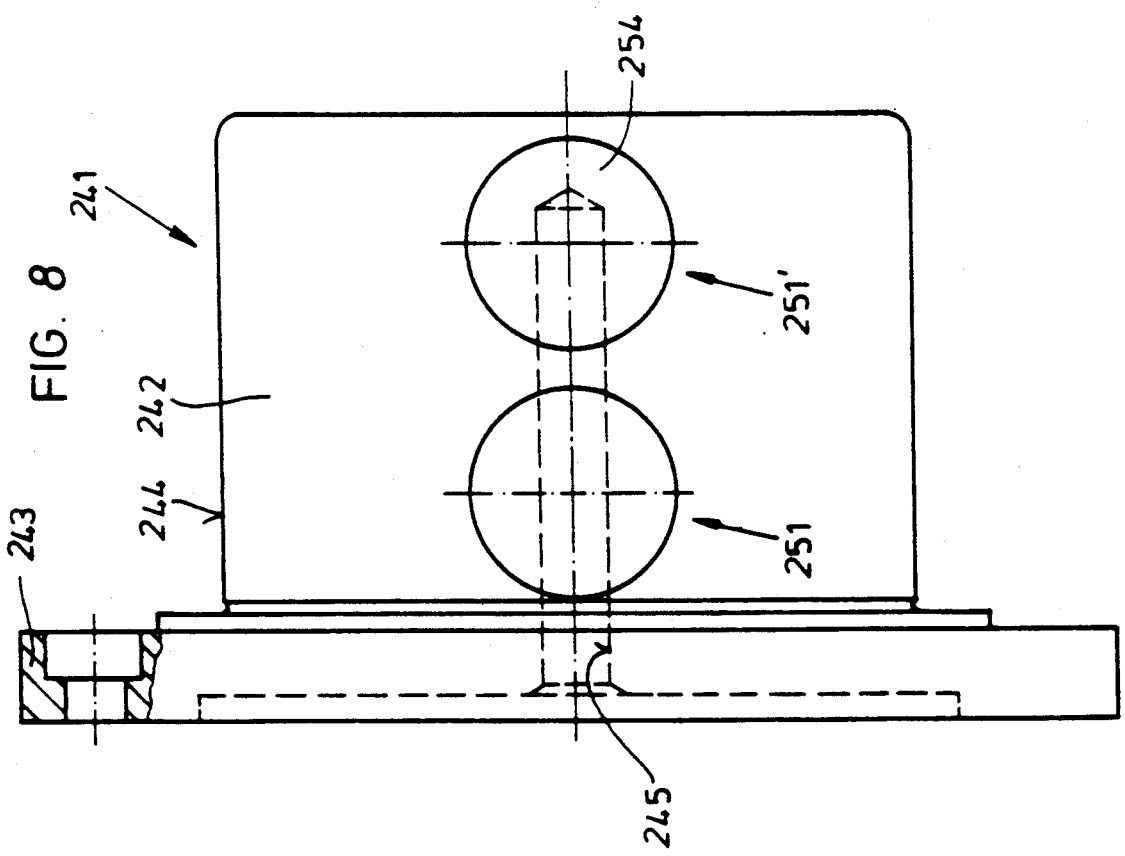
FIG. 9
FIG. 8

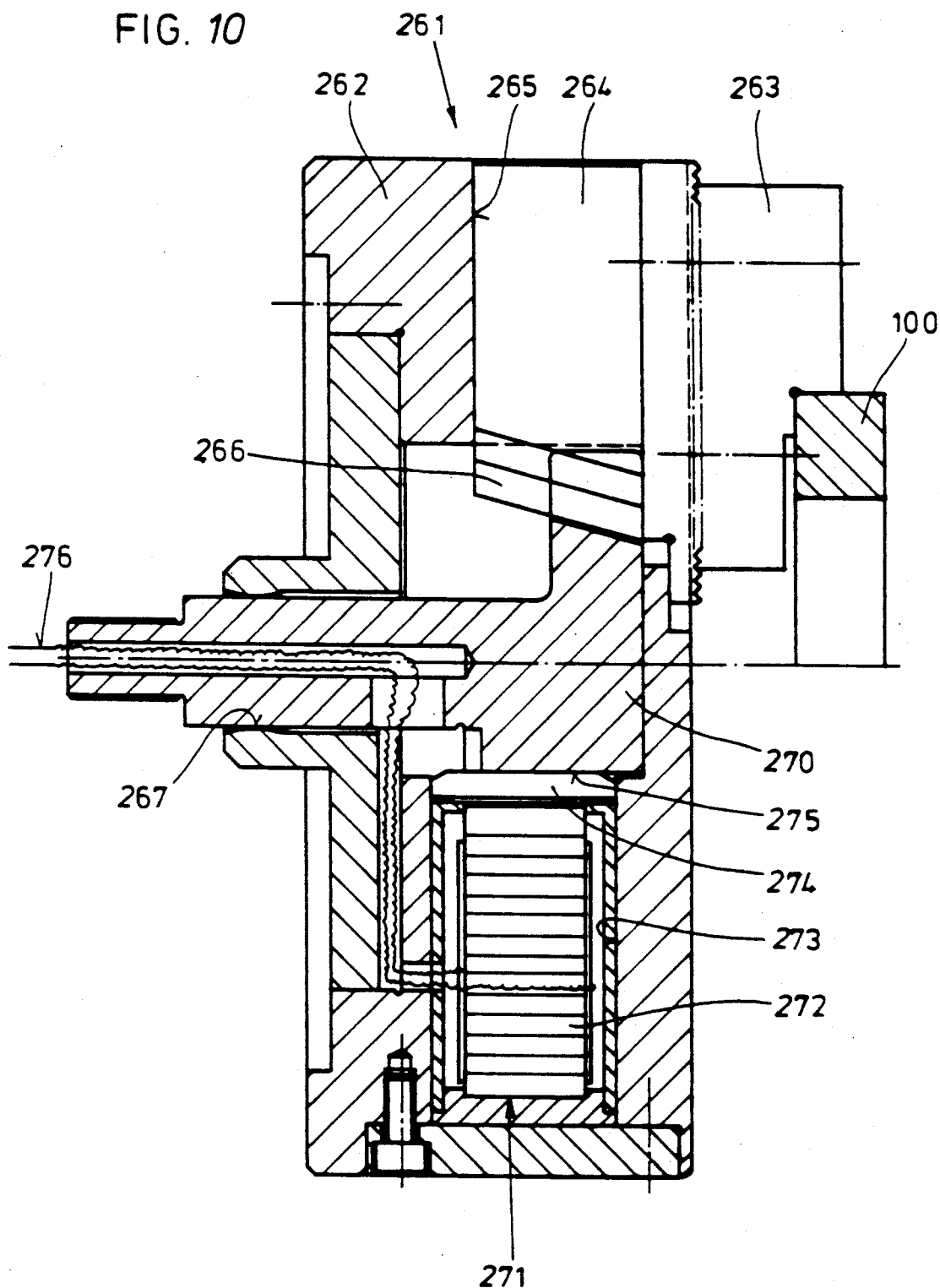

5,174,179

HOLDING DEVICE

BACKGROUND OF THE INVENTION

The present invention relates to a holding device for a workpiece to be processed on a turning machine, especially a grinding machine, which is held by a clamping device, for example, a receiving disk, a chuck equipped with drivable clamping jaws which are inserted into a casing, or a mandrel.

There are known several different embodiments of heavy-duty chucks, which clamp either by a centering action or by a compensating action. To actuate the clamping jaws, a central actuating member is used which is common to all clamping jaws, or, in order to accomodate noncircular workpieces, the clamping jaws are equipped with correcting plungers, which are pressurized by a pressure medium and have pressure compartments connected to the same pressure medium source to assure the same pressure in all compartments. An individual or defined adjustment of a selected clamping jaw cannot be achieved with any of the known heavy-duty chucks.

It is therefore an object of the present invention to provide a holding device for a workpiece to be processed on a turning machine which allows the clamping device and/ or its clamping jaws to be singly and independently actuated and adjusted to a defined value, so that, if necessary, a clamped workpiece may be easily aligned. The construction should be simple and the device should be small to allow versatile employment, while assuring a high measure of operational safety and longevity. It is especially important that the clamping device and/or its clamping jaws, depending on the concentricity and/or the planar characteristic of the clamped workpiece, may be individually and very exactly adjusted and aligned, even to very small increments, by a program control device.

BRIEF DESCRIPTION OF THE DRAWINGS

This object, and other objects and advantages of the present invention, will appear more clearly from the following specification in conjunction with the accompanying drawings, in which:

FIG. 8 shows a side view of a clamping device in the form of a mandrel;

FIG. 9 shows a cross-sectional view of the mandrel according to FIG. 8; and

FIG. 10 shows an axial sectional view of a nose key clamping device having correcting elements, which consist of piezoelectric translators acting on the actuacting element of the clamping jaws.

SUMMARY OF THE INVENTION

Figure 1A:
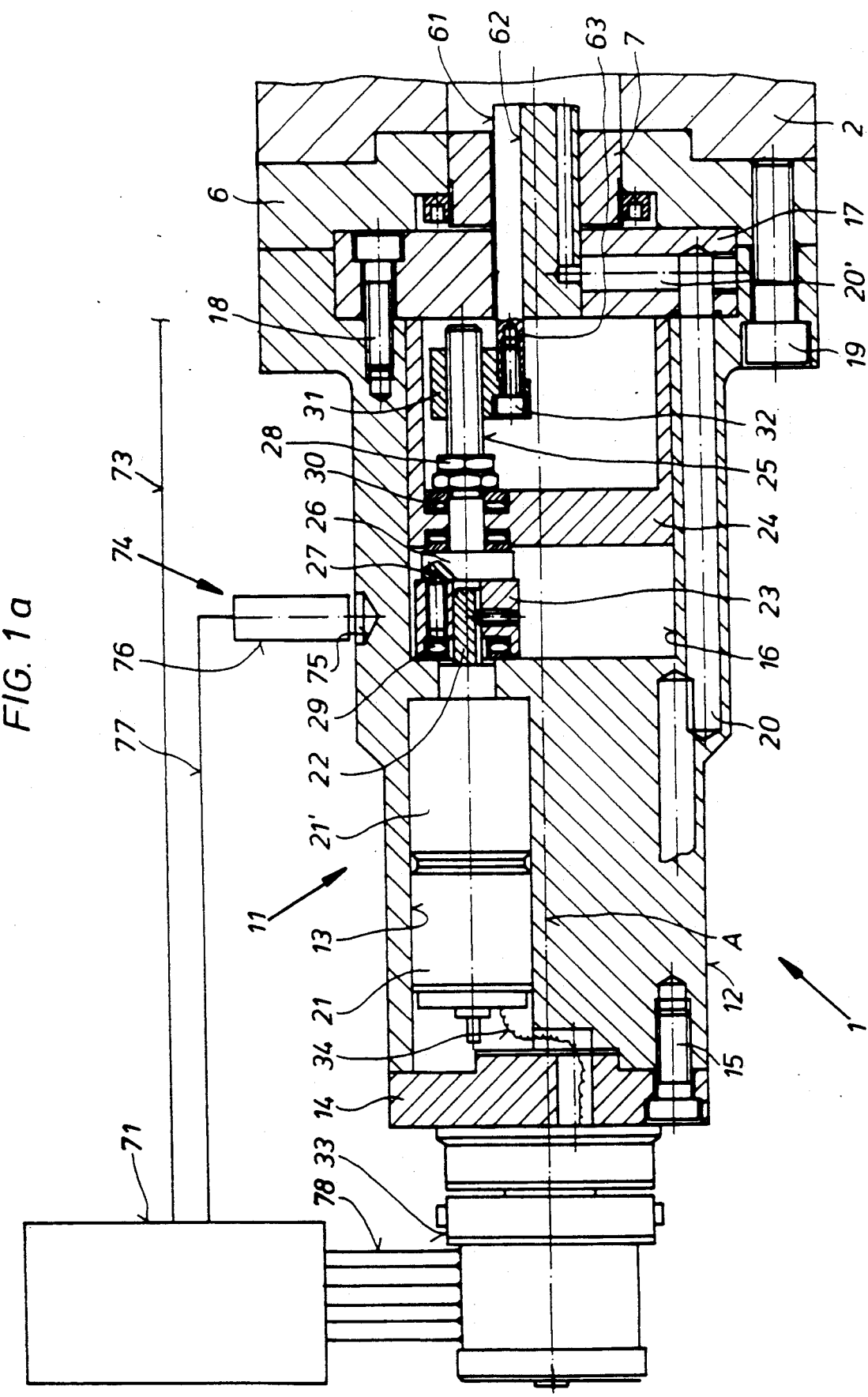
FIG. 1a and FIG. 1b show a device, attached to the front and the back of a machine spindle stock, for the radial adjustment of a clamping device.

The holding apparatus of the present invention is primarily characterized in that separate correcting elements are disposed at the clamping device and/or its clamping jaws and or the actuating members of the clamping jaws and that the separate correcting elements may be independently actuated and/or controlled by electrical, pneumatic or hydraulic means and, for the alignment and/or the clamping of the workpiece, may act directly or via a connecting link on the clamping device, its clamping jaws and/or their actuating members.

In a simple embodiment, the correcting elements may consist of three stepping motors or servo-motors, staggered at a 120° angle parallel to the longitudinal axis of the clamping device. The rotation of the motors may be transformed into a radial adjusting movement by means of a gear mechanism.

It is suitable to enclose the stepping or servo-motors in a casing, arranged at the back of the machine spindle stock, and to dispose a threaded spindle at them, which is rotatably shiftably mounted and is driven by the motors. The rotation of the threaded spindle may be transformed into an axial adjusting movement by a nut attached to a pull rod, which passes through the machine spindle stock. The shaft driven by the motor should be drivingly connected with the threads spindle by a spring catch, serving as an overload protective clutch.

Each pull rod should also be drivingly connected with a gear wheel, which is arranged perpendicular to the axis of the pull rod and enclosed in a casing attached to the front of the machine spindle stock. Each pull rod actuates one correcting member acting on the clamping device. The drive connection consists of a threaded spindle, which is axially adjustable in a threaded boring and is arranged tangential to a base circle and act directly or by connecting links, for example, roller balls, on the clamping device.

In order to easily compensate for manufacturing tolerances, an adjustment bolt, screwed into the clamping device, is disposed at the threaded spindles, which are slidable with the splines or similar means in the gear wheels, or at the connecting links, which are movable by the threaded spindles.

The clamping device preferably consists of a receiving disk, which is supported in a manner, which allows radial adjustment, and is inserted in the casing that also encloses the gear wheels and the threaded spindle. The workpiece is held by the receiving disk directly or by a connecting link such as a chuck or similar means.

To support the receiving disk in a radially adjustable manner a catch is provided. The catch, in conjunction with two keys opposite each other, and two more keys, staggered at a 90° angle, connects the receiving disk and the casing in a fixed manner and radially adjustable manner.

It is a prefered embodiment of the present invention to employ piezoelectric block translators as the correcting elements.

In another embodiment the correcting elements may consist of stepping or servo-motors, which are controlled electrically, pneumatically or hydraulically. The drive shafts of these motors are connected by a threaded spindle to a connecting link, which is radially or axially adjustable and acts on the actuating member of the clamping jaws or on the clamping jaw itself.

It is also advantageous to insert the correcting elements into the formed recesses located radially in the casing and to have the correcting elements and the clamping jaws drivingly connected via a connecting link in the form of a rocker arm, which is supported in a joint. The correcting elements, consisting of piezoelectric block translators, are equipped with a radially movable pressure plate, which has a drive connection to the inner end of the rocker arm by a joint, for example, in the form of a roller or similar means.

For the alignment, parallel to the plane of the workpiece, it is advantageous to insert the correcting elements into recesses of the casing parallel to the axis of the casing. The correcting elements then act on the connecting links with the corresponding clamping jaws.

In order to achieve an axial adjustment in a clamping device with rocker arms as connecting links, the rocker arms may be adjustable, parallel to the axis of the casing, against the force of a spring by a correcting element in the form of a piezoelectric block translator, whereby the rocker arm is inserted into a bearing box, which is movable against the force of the spring. In a clamping device consisting of a mandrel it is suitable to insert the correcting elements into radially extending recesses of the casing. The correcting elements act directly o the workpiece with a pressure plate, corresponding in shape to the outer mantle surface of the mandrel, serving as the clamping jaws. In this embodiment in order to also align the workpiece in its longitudinal direction, two or more clamping jaws or correcting elements may be aligned in series in the axial direction of the mandrel.

When the correcting elements act on the actuating member of the clamping jaws, the correcting elements are arranged diametrically opposed to the clamping jaws in the casing and act on the actuating member, which is preferably arranged like a pendulum, of the clamping jaws with a sliding contact or similar means.

The correcting elements may be controlled together or individually by electric, pneumatic or hydraulic means. It is, of course, understood, that the correcting elements may be controlled electrically, pneumatically or hydraulically depending on the concentricity and/or the planar characteristic of the workpiece.

To determine the concentricity and/or the planar characteristic of a clamped workpiece, a sensor, which is actuated by the workpiece, and, at the casing, a measuring device for the angle of rotation are provided The signals of the sensor and the measuring device for the angle of rotation, sent by one or more impulse senders inserted in the casing, for example, comprising borings or lugs and a stationary receiver, are processed in a computer to allow fast corrections.

With a device according to the present invention, in which the clamping device and/or its clamping jaws and/or the actuating members are disposed at independently actuating correcting elements it is possible, according to the respective circumstances, to arbitrarily clamp a workpiece onto a turning machine and, also, to align the workpiece, after it has been clamped, in one, two or three axis without difficulties. Since the correcting elements may be individually actuated, more or less motional energy may be fed to each clamping jaw. The exact concentricity and/or planar characteristic of a surface of the workpiece may therefore be achieved by the directed adjustment of the clamping device and/or the clamping jaws.

Useful for the employment as a correcting element are electric servo-motors and/or hydraulically or pneumatically controlled servo devices. Especially prefered are piezoelectric translators, which demonstrate a high degree of precision of adjustment and generate great forces by a continuous change of position, depending on the voltage used. With the electric energy fed to the piezoelectric ceramic disks the adjustment of the clamping jaws as well as the position of the clamped workpiece can be changed and corrected easily. The adjustment range of such a translator, which may be built into such a clamping device is only ca. 1 mm. This is, however, sufficient for clamping and/or adjusting a workpiece on, for example, a grinding machine.

There is provided a holding device, which may be constructed and manufactured in a simple and economical manner and allows easy compensation for the elasticities of the parts involved in the clamping of a workpiece and to adjust the workpiece after it had been clamped. It is, of course, also possible to achieve a centered or compensating clamping of a workpiece, even for a large adjustment range of the clamping jaws.

DESCRIPTION OF PREFERRED EMBODIMENTS

The present invention will now be described in detail with the aid of several specific embodiments utilizing FIGS. 1 to 10.

Figure 1B:
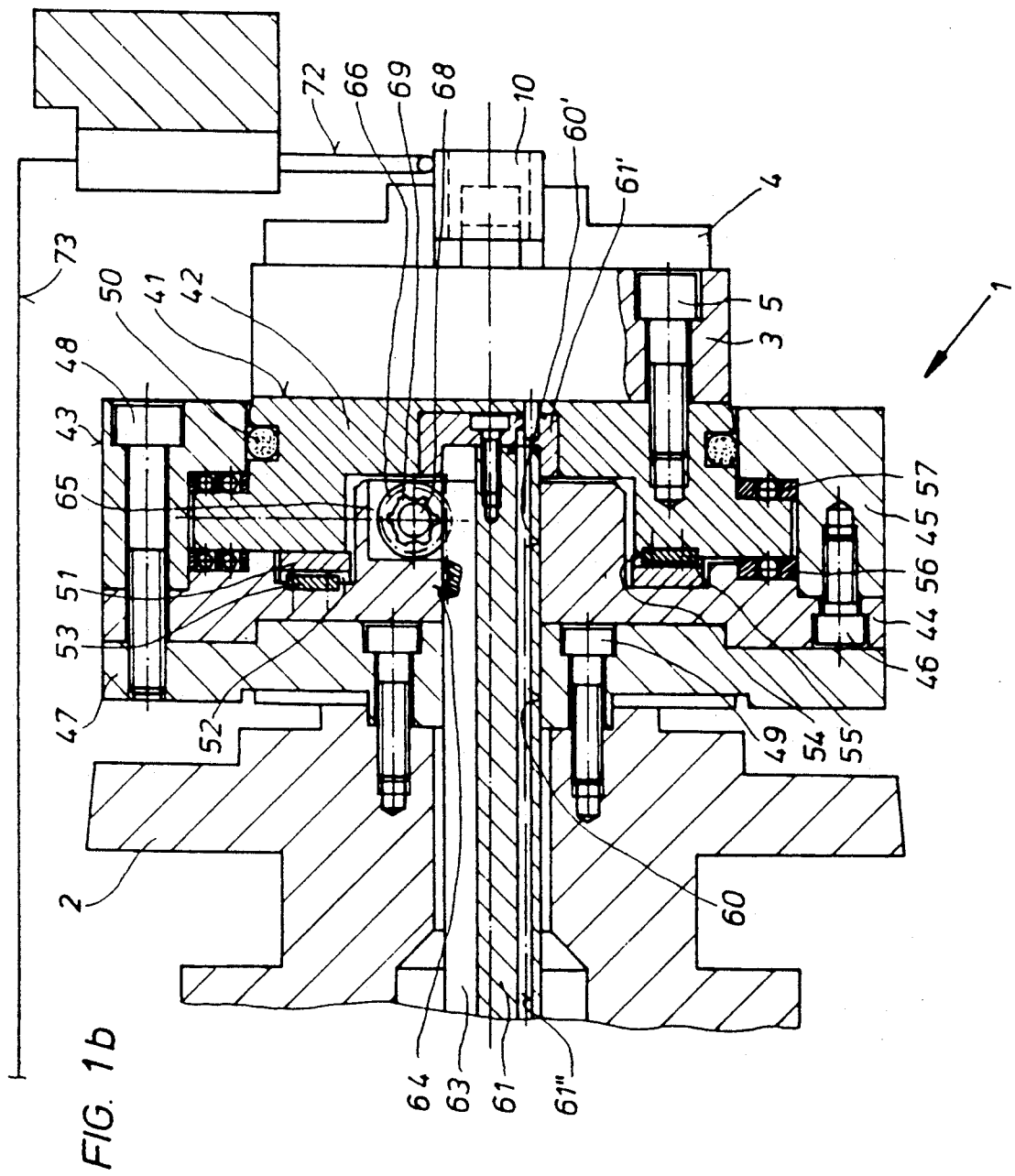

The device, represented in FIGS. 1a and 1b and marked as 1, serves to hold a workpiece 10 with a heavy-duty chuck 3 at a machine spindle stock 2 of a turning machine. The workpiece 10 is clamped between the radially adjustable clamping jaws 4 of the heavy-duty chuck 3. In order to adjust the workpiece 10 in its radial direction, the heavy-duty chuck 3 is attached by screws 5 to a clamping device 41, which is arranged at the front of the machine spindle stock 2 and is radially adjustable.

For the controlled, radial adjustment of the clamping device 41, which consists of a receiving disk 42 and is enclosed in a casing 43, three correcting elements 11, enclosed in a casing 12, are provided at the back of the machine spindle stock 2. The correcting elements 11 are staggered at a 120° angle parallel to the rotation axis A of the machine spindle stock 2. The correcting elements 11 consist of the electrical servo-motors 21, which are inserted into the recesses 13, formed in the casing 12 and act on the clamping device 41 with gearing elements. The recesses 13 are enclosed by a cover 14, which is attached by screws 15 to the casing 12. A rotating distributor 33 is attached to the cover 14 and the power supply wires 34 of the servo-motors 21 are passed through the cover 14.

The transformation of the rotation of the correcting elements 11 into the axial adjusting movement is achieved by a threaded spindle 25, equipped with a nut 31 and attached by a screw 32 to a pull rod 63, which is passed through the machine spindle stock 2. The threaded spindles 25 pivot in a bearing 30 at a support 24, which is arranged in another recess 16 of the casing 12 and held by a collar 26, formed as an integral part of the support 24, and the counter nuts 28. The drive connection of the servo-motors 21, equipped with the gears 21', with the threaded spindles 25 is achieved by a sleeve 23, which is attached to a drive shaft 22 in a fixed manner and is supported by a bearing 29 at the casing 12. As an overload protection, a spring catch 27, which interacts with the collar 26, is inserted into the sleeve 23.

The recess 16, which contains the support 24, of the casing 12 is enclosed with a cover 17, attached to the casing 12 with screws 18. The hydraulic medium supply lines 20 and 20', which are only partially shown, are passed through the casing 12 and the cover 17. The hydraulic medium reaches the heavy-duty chuck 3 via the lines 20 and 20', which are fed by the rotating distributor 33. The casing 12 is attached to a ring 6, which is inserted into the machine spindle stock 2, by screws 19.

When the threaded spindles 25 are moved in the direction of the rotation by the correcting elements 11 consisting of servo-motors 21, the nuts 31 are axially adjusted, depending on the direction of rotation, to the left or to the right. The pull rods 63, which are connected, in a slidable manner, to the recesses 62 of a guide rod 61, inserted into the machine spindle stock 2, are attached to the threaded spindles 25 and, in the same manner, are moved back and forth with them. On the front of the machine spindle stock 2, the axial adjustment movements of the pull rods are reversed in the radial direction and the clamping device 41 is accordingly influenced such that the heavy-duty chuck 3 and the workpiece 10 are radially adjusted.

Figure 2:
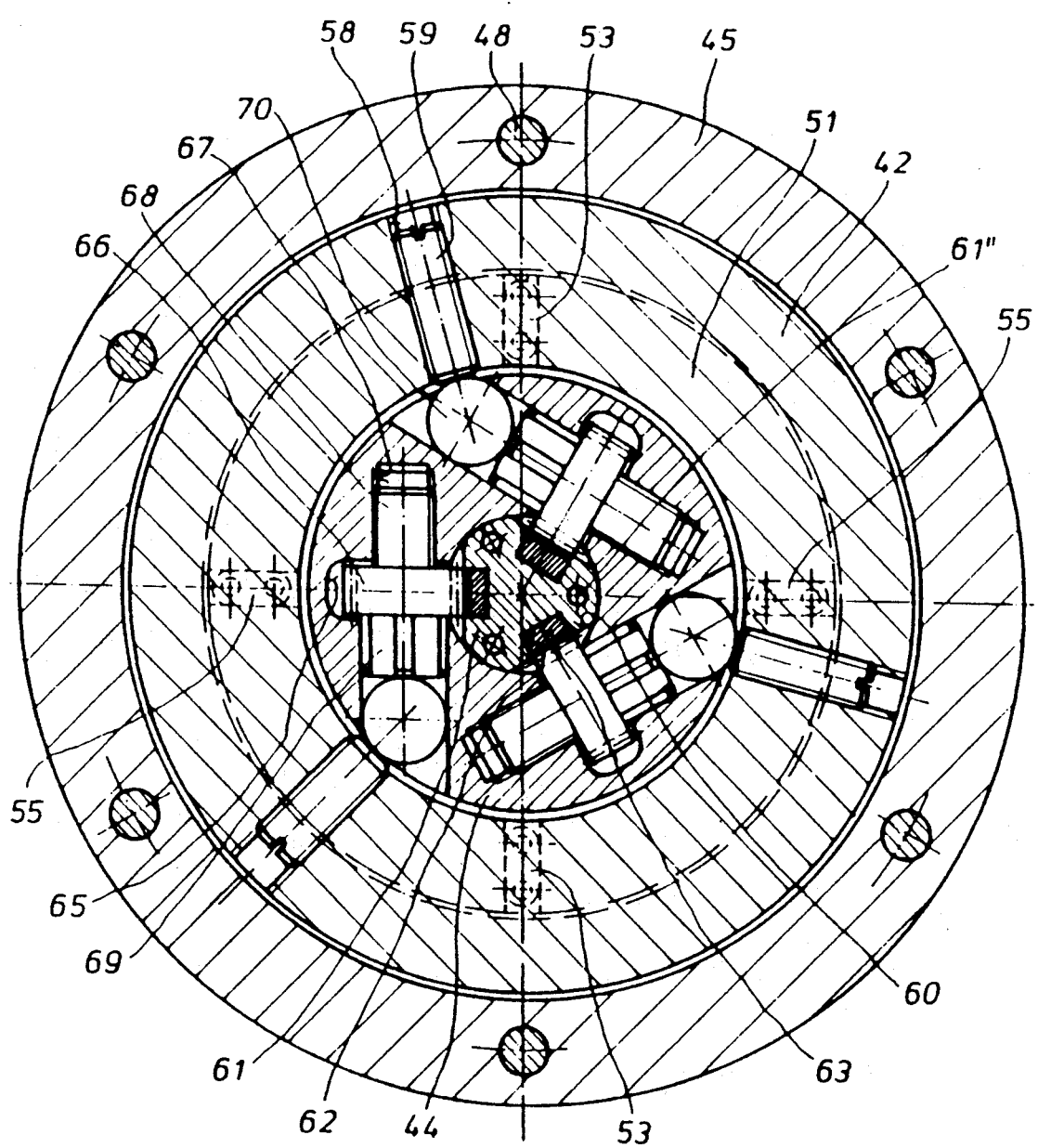
FIG. 2 is a cross-sectional view, perpendicular to the longitudinal axis of FIG. 1b, of the part of the apparatus, arranged at the front of the machine spindle stock.

As shown in the FIGS. 1b and 2, this is achieved by equipping each of the pull rods 63 on their front sections with a gear-tooth system 64, which engages the gear wheels 66 arranged in a casing 43. The casing 43 consists of a disk 44 and a ring 45, which are connected by screws 46. The gear wheels 66 are inserted into recesses 65, which are formed in the disk 44, and are connected in a fixed manner by a splined shaft gear-tooth system 69 to a threaded spindle 68, which are arranged tangential to a base circle and are screwed into the threaded borings 67. The axial adjustment movements of the pull rods 63 are transformed into axial movements of the threaded spindles 68 in their axial direction by the gear wheels 66, in which the threaded spindles 68 may be moved by the splined shaft gear-tooth system 69. With roller balls 70, acting as a connecting link, the threaded spindles 68, with their ends provided with the splined shaft gear-tooth system, act on the clamping device 41 (i.e., the receiving disk 42), so that the clamping device 41 is radially adjusted, due to the action of the balls 70 on the adjusting bolts 59, according to the adjustment movement of the threaded spindle 68. The manufacturing tolerances of the parts involved in the transfer of force may be compensated for by adjusting bolts 59, inserted into threaded borings 58 of the receiving disk 42.

When radial adjustment takes place, the fixed connection of the receiving disk 42 to the machine spindle stock 2 is achieved by the catch 51. On the disk 44 of the casing 43, two keys 53 are attached, opposite to each other, which engage the radially oriented slots 52 formed in the catch 51. The receiving disk 42 is also equipped with two keys 55, which are staggered at a 90° angle relative to the keys 53 and are guided in the slots 54 formed in the catch 51. This allows the catch 51, which is supported by a bearing 56 at the disk 44 and by a bearing 57 at the ring 45, to carry out radial movements, because the keys 53 and 55 act as a universal joint. The casing 43, which encloses the clamping device 41 and the respective correcting elements, is attached by screws 48 to a disk 47, which is connected to the machine spindle stock 2 by screws 49, so that the machine spindle stock 2 drives the clamping device 41 and the heavy-duty chuck 3, attached to the clamping device 41. The gap between the clamping device 41 and the ring 45 of the casing 43 is sealed by a sealing 50.

The guide rod 61 carrying the pull rod 63 is supported by a shrunk-on collar 7 at a ring 6, attached to the back of the machine spindle stock 2, and centered in a fitted boring 60, formed in the disk 47, at the front of the machine spindle stock 2. The guide rod 61 passes through the fitted boring 60 and another boring 66' formed in the disk 44 and is equipped with lines 61" which communicate with the hydraulic medium supply lines 20' of the cover 17. The hydraulic medium may be introduced via a cover 61', into which the lines 61" extend and in which the lines 61" lead to the heavy-duty chuck 3.

In order to activate the correcting elements 11 and to thereby easily adjust the workpiece 10 in its radial direction by the radial adjustment of the clamping device 41, the apparatus 1 is equipped with a control unit 71. The control unit 71 may be controlled with a sensor 72, interacting with the workpiece 10, and a measuring device 74 for the angle of rotation. The sensor 72 and the measuring device 74, which consists of a impulse sender 75 and a sensor 76 interacting with the impulse sender 75, are connected to the control unit 71 with control lines 73 and 77. The control unit 71 sends the respective signals to the correcting elements 11 via control lines 78.

The control unit 71 processes the incoming impulses from the sensor 72 and the measuring device 74 for the angle of rotation, and controls the correcting elements such that the clamping device 41 is radially adjusted to a position where the outer mantle surface of the workpiece 10, clamped into the heavy-duty chuck 3, rotates smoothly, i.e., runs true. In the adjustment process, one or two of the correcting elements are adjusted forward and the others backward, so that the threaded spindles 68, connected to the correcting elements 11 and driven by the gear means, are correspondingly adjusted forward and backward, thereby radially adjusting the receiving disk 41.

Figure 3:
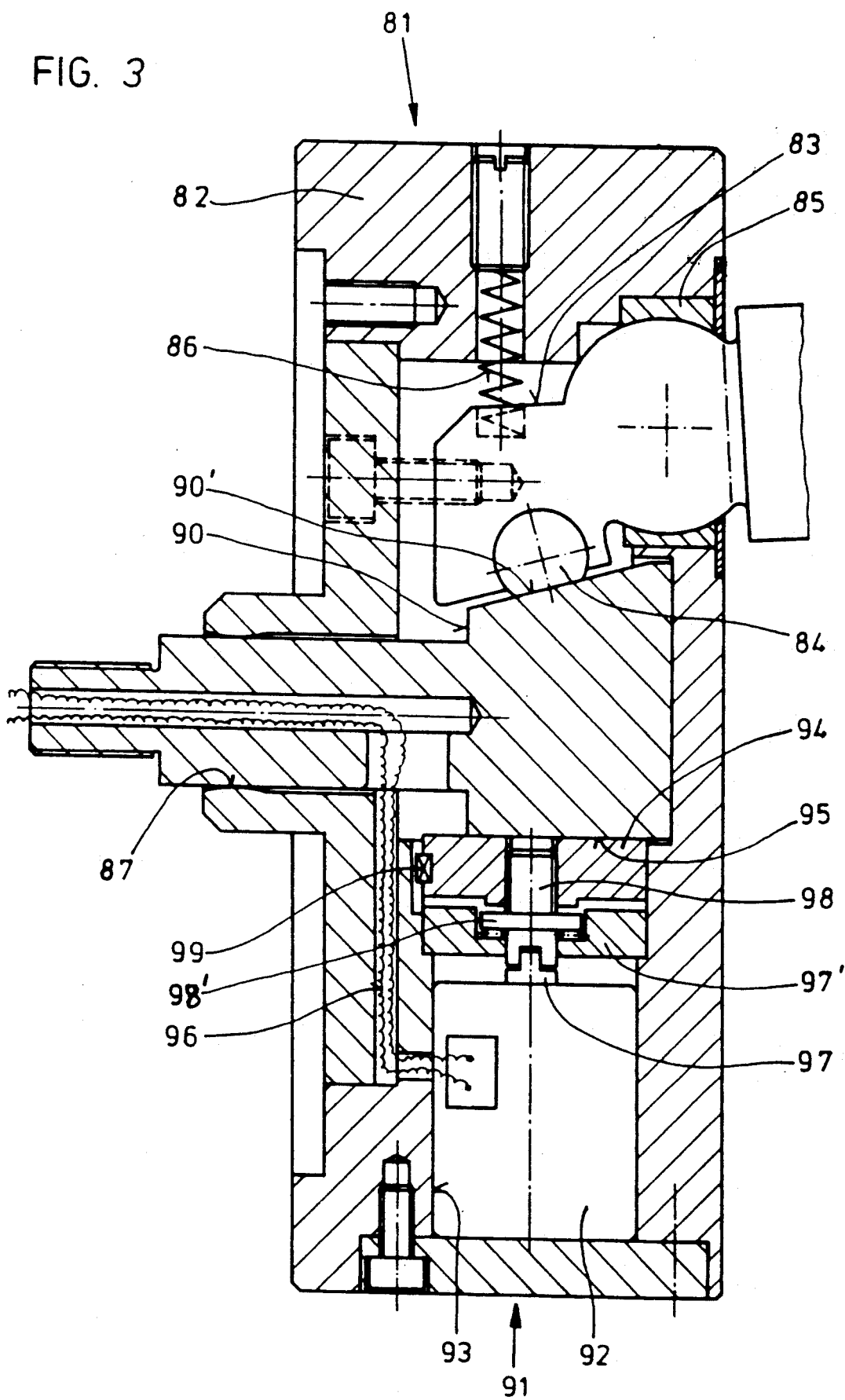
FIG. 3 is a sectional axial view of a clamping device in the form of a rocker arm chuck, having servo-motors as correcting elements, which act on the actuating elements.

In the clamping device 81, according to FIG. 3, an actuating member 90, attached to both clamping jaws, which are not represented in the FIG. 3, is moved towards the clamping jaws. This is achieved by the correcting elements 91, inserted into a chuck 82 and diametrically arranged to the rocker arm 83, which act on the actuating members 90.

The axial adjustment of the actuating member 90 is transferred to the rocker arms 83, which are held in bearing boxes 85 and are equipped with rollers 84 as a joint support, by a slant 90' formed at the actuating member 90. The rocker arms 83 are thereby tilted against the force of a return spring 86. If the clamped-in workpiece, however, does not run true, the actuating member 90, which is supported by a spherical surface at the chuck 82 is moved a defined length from the center in the direction of one of the rocker arms 83.

The correcting elements 91 of the clamping device 81 consist of stepping motors 92, which are inserted into radial borings 93 of the chuck 82 an are supplied with electrical power via the lines 96. The drive shaft 97 of each stepping motor 92 is connected in a driving manner to a threaded spindle 98, which is supported and rotatable at a disk 98'. The threaded spindle 98 is also supported by a sliding contact 94, which is held in a fixed manner by a wedge 99.

When one of the stepping motors is actuated, due to the transduction of the rotation of the drive shaft 97, the sliding contact 94 is axially shifted in the direction of the actuating member 90 and is pressed against a sliding surface 95, whereby the sliding surface 95 is deflected according to the movement of the sliding contact 94.

Figure 4:
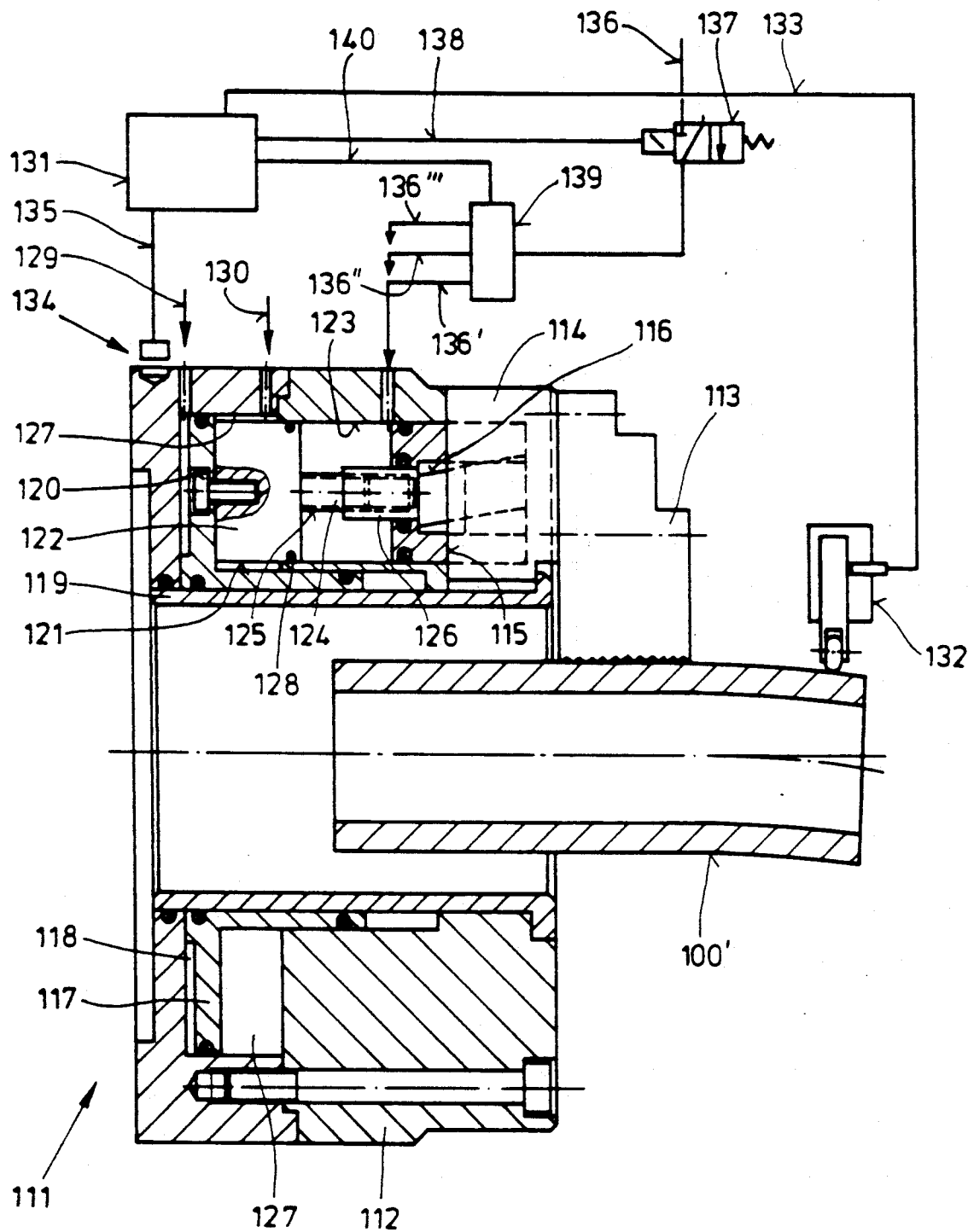
FIG. 4 shows a heavy-duty chuck, having pneumatic control servo-motors as correcting elements which are arranged at the clamping jaws.

The heavy-duty chuck, shown in FIG. 4 and marked as 111, is used for the clamping of a bent workpiece 100'. It consists of base jaws 114, inserted in radially directed slots 115 of a chuck 112 and clamping jaws 113 attached to the base jaws 114 The clamping jaws 113 are used to clamp the workpiece 100' in the center of the heavy-duty chuck 111. In order to actuate the base jaws 114, a plunger 117 is provided, which is connected in a driving manner to the base jaws with a wedge-type rod 116.

When the pressure compartment 118 is pressurized with a pressure medium, the plunger 117, which is slidable on a sleeve 119, is moved to the right. The axial movement of the plunger 117 is transformed by the wedge-type rods 116, whereby the base jaws 114 as well as the clamping jaws 113 are radially adjusted and the workpiece 100' is centered and clamped in the heavy-duty chuck 111.

In order to achieve a repositioning of the workpiece 100' in the heavy-duty chuck, each of the clamping jaws 113 is separately adjustable. Each wedge-type rod 116 is equipped with a correcting element 121, consisting of a pneumatically controlled stepping motor 122, which is inserted in the formed recesses 123 axially extending in the chuck 112 and which are attached, for example, with screws 120 at the plunger 117. The drive shaft 124 of the stepping motors 122 is equipped with a thread 125 and engage a hollow spindle 126 attached to the wedge-type rod 116, whereby the rotation of the drive shaft 124 of the stepping motor is transformed into an axial movement.

When the pressure medium is introduced into the pressure compartment 118 via the pressure line 129, the stepping motors 122 and the wedge-type rods 116 are moved as a unit by the plunger 117. When the pressure medium is introduced into the pressure compartment 127 via the pressure line 130, the stepping motors 122 and the plunger 117 are simultaneously moved, whereby the plunger 117 reaches the final position but the stepping motors 122 return to their starting position, because their inlet lines are connected to the pressure compartment 127, which causes the drive shafts 124 to unscrew from the hollow spindles 126.

For the alignment of a workpiece 100', which rotates in the area of a sensor, arranged at a distance from the heavy-duty chuck, for example, in order to cut a thread, the following procedure is employed: the sensor 132 actuates a control unit 131 via a control line 133. A measuring device 134 for the angle of rotation, attached to the heavy-duty chuck, is also connected to the control unit 131. A control valve 137, inserted into a pressure line 136, also communicates with the control unit 131 via a line 138. The control valve allows the short term introduction of the pressure medium into the distributor valve 139. The distributor valve, as desired, may be connected by the pressure lines 136', 136" and 136'" to the pressure compartments 123, which are sealed against the pressure compartment 127 with sealings 128 and which are each related to one of the correcting elements 121. The respective stepping motor is actuated by releasing the clamping jaw connected to the correcting members During the alignment of the workpiece 101', when the workpiece is rotating slowly, the sensor 132 produces an impulse at the so-called lowest position which is sent via the control line 133 to the control unit. At the same time, the angular position of the heavy-duty chuck 111 is measured with the measuring device 134 for the angle of rotation, which is also connected via a control line 135 to the control unit 131. The pressure medium is then introduced into one of the pressure compartments 123, selected by the control unit 131, via the distributor valve 139, which is also connected to the control unit 131 by a line 140, by a valve 137, which is opened for a short time. The respective stepping motor is thereby rotated back in a defined step and the corresponding clamping jaw is retreated, while the other two clamping jaws are readjusted by the plunger 117, so that the workpiece 100' in the heavy-duty chuck is moved in the direction of the retreated jaw. This procedure is repeated until the workpiece 100' rotates smoothly, i.e., runs true, in the area of the sensor 132.

Figure 5:
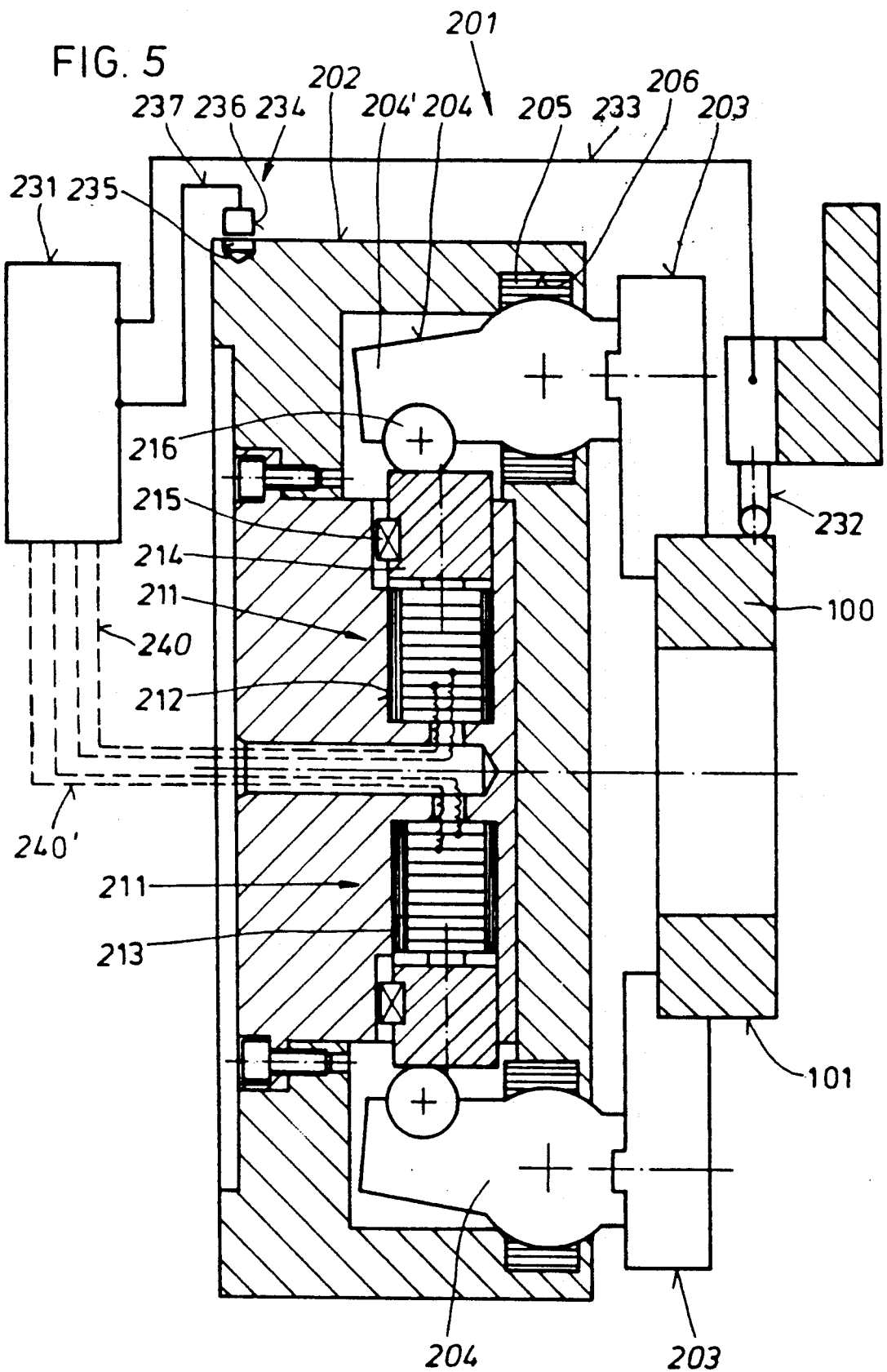
FIG. 5 is a sectional axial view of a clamping device, equipped with correcting elements, which consist of piezoelectric translators and act on the clamping jaws.

The clamping device 201, according to FIG. 5, is used to hold a workpiece 100 in a turning machine and consists of a two-jaw chuck. The clamping device 201 is equipped with two prism-shaped clamping jaws 203, which are diametrically arranged opposite each other and are attached to rocker arms 204 supported in a casing 202. The rocker arms 204 pivot in a bearing box 205 inserted in a recess 206.

To actuate the rocker arms 204, correcting elements 211 are provided. Each of the rocker arms 204 has one designated correcting element 211, consisting of a piezoelectric translator 212 which are inserted in radially directed recesses 213 of the casing 202. The correcting elements 211 act individually on the rocker arms 204 by utilizing a pressure plate 214, which is held in a fixed manner by a wedge 215, and a roller 216, attached to the inner end 204' of the rocker arm 204 and acting as a joint.

To align the outer mantle surface 101 of the workpiece 100, even after it has been clamped, the correcting elements 211 may be actuated separately, depending on the angle of rotation of the workpiece 100. A sensor 232 is used to scan the outer mantle surface 101, and a measuring device 234 for the angle of rotation, by which a section of the outer mantle surface 101, rotating out of center, may be determined, is provided. The sensor 232 and the measuring device 234 are connected to the control unit 231 by control lines 233 and 237. The control unit 231 evaluates the incoming signals and also provides electrical power to the correcting elements 211. In the presented embodiments, the measuring device 234 comprises one or more pocket borings 235, formed in the casing 202 and serving as the impulse senders, and a permanent sensor 236, which consists of a proximity switch.

Before the work on the workpiece 100 is started, one or more rotations of the workpiece are monitored, and according to the impulses, sent by the sensor 232 and the measuring device 234 and processed by the control unit 231, the voltage at the correcting elements 211 is adjusted via the control lines 240 and 240', whereby the position of the workpiece 100, clamped between the clamping jaws 203, may be adjusted in one axis resulting in the alignment of the outer mantle surface 101. When the workpiece 100 is clamped, the same voltages must be applied to the correcting elements 211 in order to assure an equal and centered clamping action of the clamping jaws 203.

Figure 6:
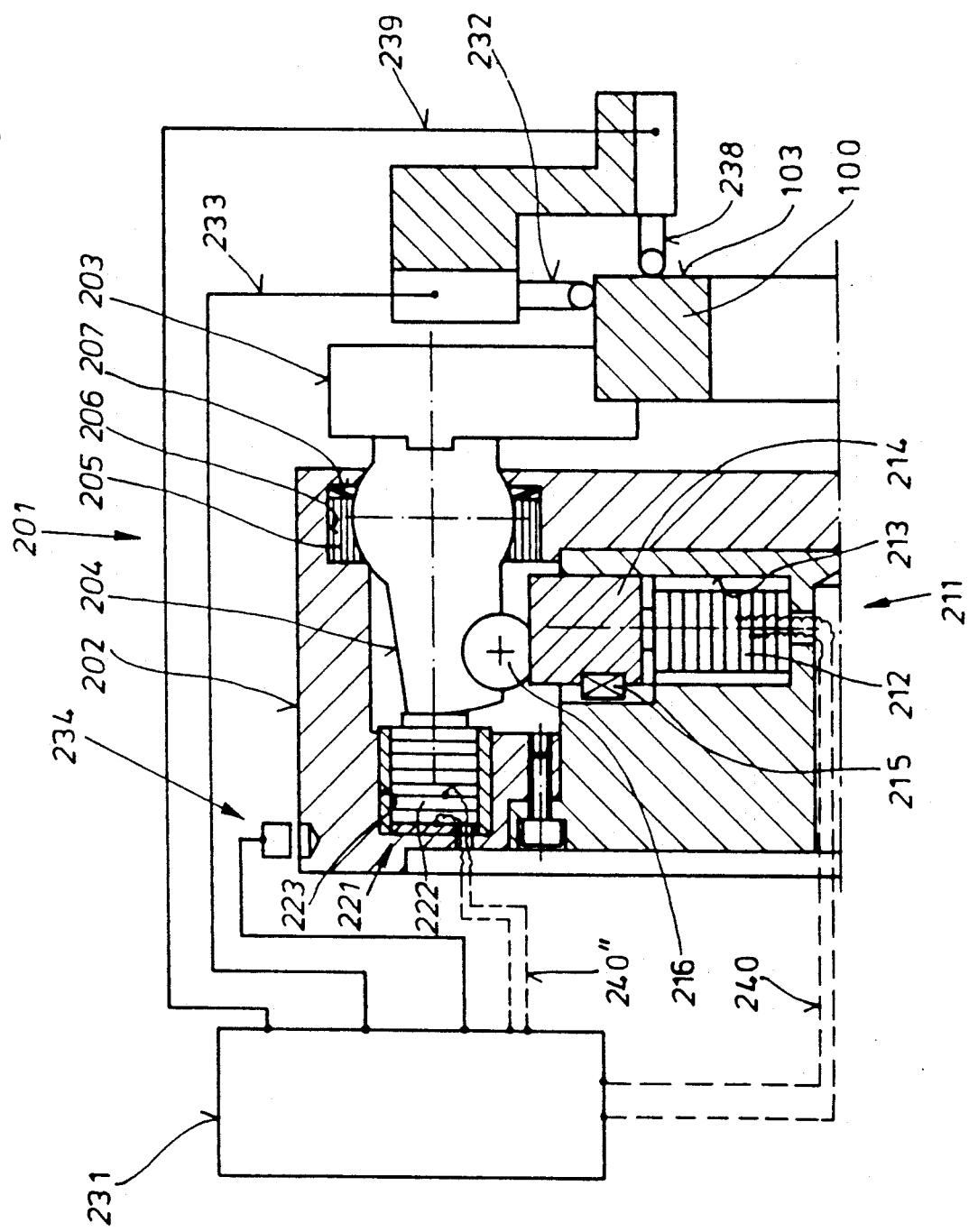
FIG. 6 shows the clamping device of FIG. 5 with additional correcting elements for the axial adjustment.

The embodiment according to FIG. 6 the planar characteristic of the face 103 of the workpiece 100 may be determined and, if necessary, axially adjusted. Another sensor 238 is therefor provided, which rests at the face 103 and is connected to the control unit 231 by a control line 239. There are also correcting elements 221 provided, which act axially on the rocker arms 204 and which are connected to the control unit by control lines 240".

The correcting elements 221, consisting of piezoelectric translators 222, are inserted into axially arranged borings 223 of the casing 202. The bearing box 205 of the rocker arms 204 may slide axially against the force of a spring 207, so that, according to the voltage applied to the correcting elements 221 one or the other rocker arm 204 is moved forward, to a certain extent, in the direction of the clamping jaws 203, whereby the planar characteristic of the face 103 of the workpiece 100 may be influenced.

Figure 7:
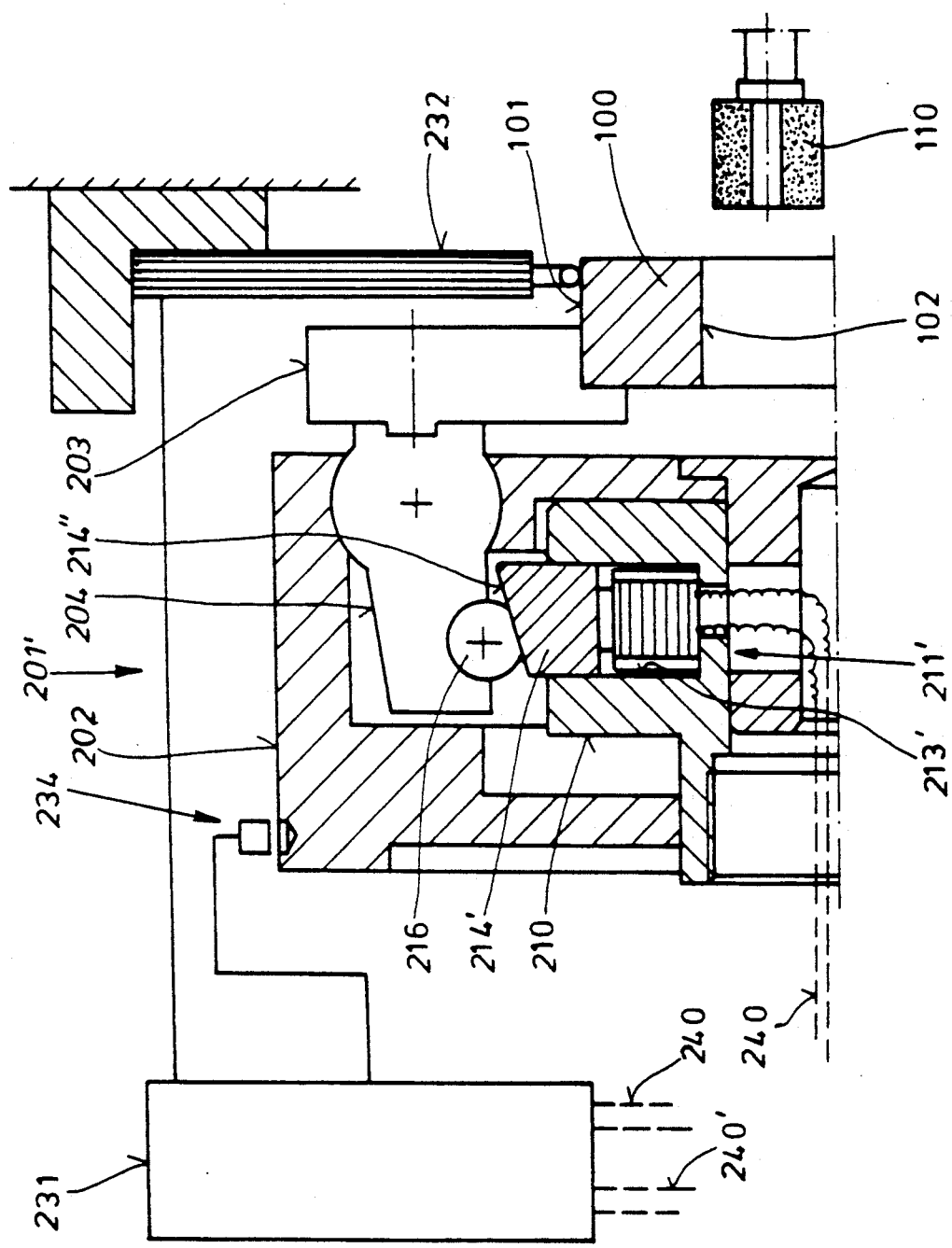
FIG. 7 shows the clamping device of FIG. 5 with correcting elements arranged in an actuating element.

According to the clamping device 211' shown in FIG. 7, the correcting elements 221 may also be inserted into the actuating member 210, with which, by an axial movement, the clamping jaws 203 are simultaneously actuated, whereby the clamping of the workpiece 100 is achieved. The actuating member 210 is equipped with radially directed borings 213', into which the correcting elements are inserted. The faces 214" of the pressure plate 214' are axially slanted, so that, by an axial movement of the actuating member 210, the rollers 216 are radially adjusted and the rocker arms 204 are therefore pivoted.

When the outer mantle surface 101 of the workpiece 100 does not rotate on its center, as determined by the sensor 232 and the measuring device 234, the correcting elements 211 are provided with different voltages, causing the pressure plate 214' to be moved in or out and the workpiece 100 to be aligned exactly centered. The inner bore 102 of the workpiece 100 may then be machined with a grinding tool 110 on a grinding machine without eccentric error in relation to the outer mantle surface 110.

The clamping devices as shown in the FIGS. 8 and 9 consist of a tension lug 241. In a casing 242, which may be attached by a flange 243 to a turning machine, two correcting elements 251 and 251' are axially aligned in series. The piezoelectric translators 252 are inserted into the borings 253 of the casing 242. They act on a workpiece, which is to be clamped, such that the workpiece may also be aligned in its longitudinal direction, by means of the pressure plates 254. The outer surface of the pressure plates 254 matches the shape of the outer mantle surface 244 of the casing 242. The correcting elements 251 and 251' are connected to a power supply by control lines 250, which are passed through borings 245 to the correcting elements 251, 251'.

It is, of course, possible to arrange only one set of correcting elements 251 and 251', equally spaced, on the circumference of the tension lug 241. The workpiece which is to be clamped is then aligned flush with the flange 243.

In the clamping device 261, according to FIG. 10, the correcting elements 271, inserted into the chuck 262, act on a actuating member 270. Connected in a driving manner to the actuating member 270 are base jaws 264, which are radially adjustable in slots 265 of the chuck 262 by nose-keys 266. The clamping jaws 263, which are used to clamp the workpiece 100, are screwed onto the base jaws 264.

In order to align the workpieoe 100 in this embodiment, the actuating member 270 is moved. This is achieved by supporting the actuating member 270 on a spherical surface 267 at the chuck 262 and by inserting the correcting elements 271, consisting of piezoelectric block translators 272, into borings 273, which are diametrically opposed, in relation to the base jaws 264, in the chuck 262. The correcting elements 271, supplied with voltage by control lines 276, act on the actuating member 270 with sliding contacts 274, which rest on the sliding surfaces 275 of the actuating member 270, whereby the workpiece 100 is aligned according to the movement of the actuating member 270, caused by the degree of actuation of the actuating member 270.

The present invention is, of course, in no way restricted to the specific disclosure of the specification, examples and drawings, but also encompasses any modifications within the scope of the appended claims.

What I claim is:

1. In a turning machine, in which a workpiece is held in a clamping device that is radially adjustable; a holding device comprising:

a plurality of separate correcting elements, which can be individually controlled by an electric means and act on said clamping device for correcting a clamping position of said clamping device; said correcting elements comprising servo-motors, which define longitudinal axes arranged parallel to the longitudinal axis of said clamping device; and means including a gear means, acting on said clamping device, for transforming the rotation of said servo-motors into a radial adjusting movement for radially adjusting said clamping device.

2. A holding device according to claim 1, wherein said servo-motors are enclosed in a casing, which is arranged at the back of a machine spindle stock of said turning machine.

3. A holding device according to claim 1, wherein said means including gear means include a first threaded spindle disposed at each of said servo-motors, said first threaded spindle being driven by said servo-motors; and the rotation of said first threaded spindle is transformed into an axial adjustment movement by a nut, which is firmly attached to a pull rod, said pull rod being passed through a machine spindle stock and acting on said clamping device by said gear means.

4. A holding device according to claim 3 wherein a drive shaft of said servo-motors, is drivingly connected to said first threaded spindle via a spring catch.

5. A holding device according to claim 3, wherein each of said pull rods is drivingly connected to a gear wheel which is arranged perpendicular to the axis of said pull rods and is enclosed in a casing, said casing being disposed at the front of said machine spindle stock; and said pull rods each actuating an adjustment member, which acts on said clamping device.

6. A holding device according to claim 5, wherein each of said adjustment members consists of a second threaded spindle, said such threaded spindles are arranged tangential to a base circle and are disposed in a threaded boring and are adjustable in the axial direction of said threaded boring and act via connecting links in the form of roller balls on the clamping device.

7. A holding device according to claim 6, wherein adjustable adjustment bolts are screwed to said clamping device and are disposed one of each said second threaded spindle and said connecting links being in the form of roller balls, which connecting links are moveable by said second threaded spindle.

8. A holding device according to claim 6, wherein said second threaded spindles may slide with splines in said gear wheels.

9. A holding device according to claim 6, wherein said clamping device comprises a receiving disk, which receiving disk is radially adjustable and is enclosed in said casing, which contains said gear wheels and said second threaded spindle; and by which receiving disk said workpiece is held by a connecting link in the form of a chuck.

10. A holding device according to claim 9, wherein a catch is provided for the radially adjustable support of said receiving disk; and said catch, in conjunction with four keys staggered at an 90° angle from one another, connects said receiving disk in a radially adjustable manner 11. A holding device according to claim 1, wherein said correcting elements may be controlled, individually or together, electrically.

12. A holding device according to claim 1, wherein three of said stepping motors or servo-motors are provided which are staggered at an angle of 120° relative to one another.

* * * * *